Patented Feb. 23, 1932

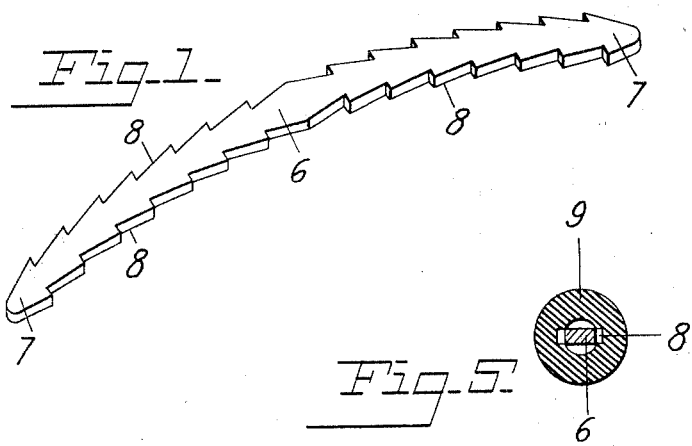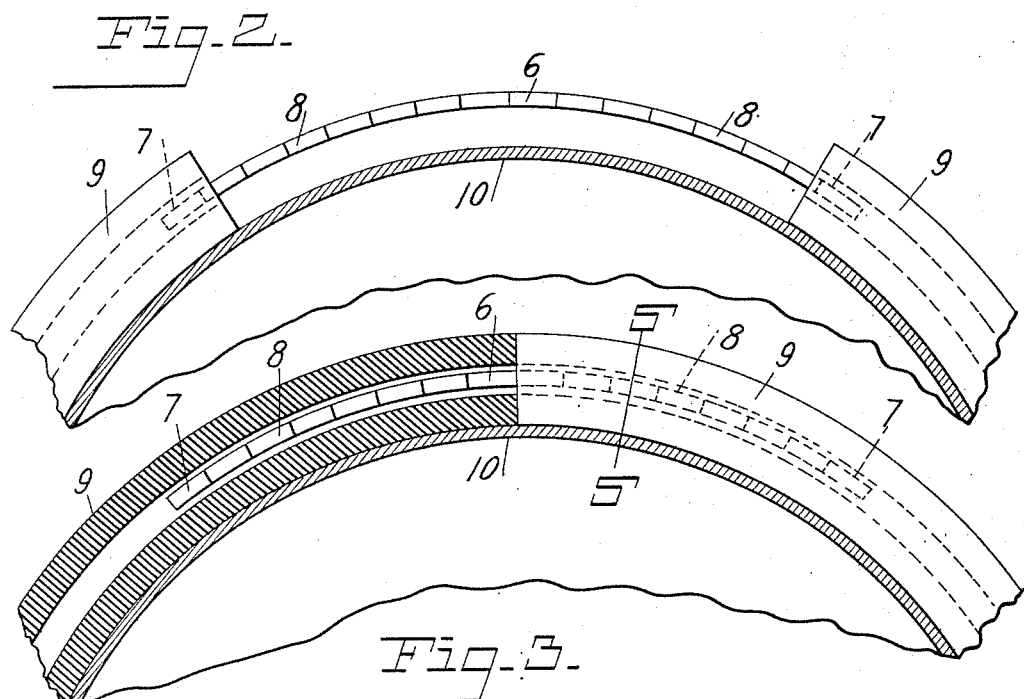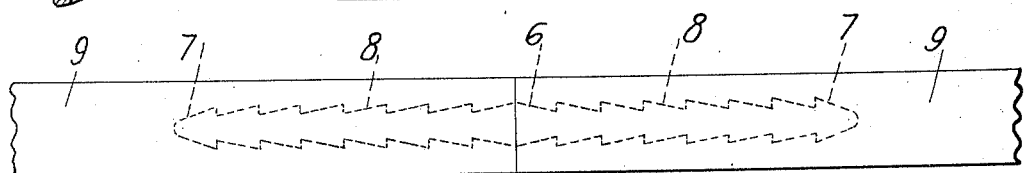

1,846,082

UNITED STATES PATENT OFFICE

CHARLES C. BLACKMORE, OF DAYTON, OHIO, ASSIGNOR TO THE DAYTON TOY & SPECIALTY COMPANY, OF DAYTON, OHIO, A CORPORATION OF OHIO

CONNECTING DEVICE FOR SECURING A TIRE TO THE RIM OF A VEHICLE WHEEL

Application filed September 23, 1929. Serial No. 394,457.

This invention relates to a connecting device for securing a tire about the rim of a vehicle wheel and is designed more particularly for securing tires to the wheels of toy vehicles and other small vehicles but is not limited to such use. Rubber tires have been secured to wheels in various ways but the more common method consists in passing a wire through a longitudinal opening in the tire, drawing the wire tight to bind the tire to the rim of the wheel, and then twisting the ends of the wire together to secure the tire in place. In so applying a tire it is necessary to force the ends of the tire back along the wire to expose the parts of the wire which are to be twisted together and, after the wires have been twisted, to force the ends of the tire over the twisted wire and into abutting contact. This method of securing a tire is efficient but the labor and time required are so great that the cost is quite high, this being particularly true in the case of toy vehicles and the like.

One object of the invention is to provide a method whereby the ends of the tire may be connected one to the other and the tire firmly secured about the wheel rim with a minimum of labor and time.

A further object of the invention is to provide a simple inexpensive device by means of which the ends of the tire may be quickly and easily connected one to the other.

Other objects of the invention will appear as the device is described in detail.

In the accompanying drawings Fig. 1 is a perspective view of a connecting device made in accordance with my invention; Fig. 2 is a side elevation of a tire, with the rim in section, showing the position of the parts at the beginning of the connecting operation; Fig. 3 is a similar view showing the ends of the tire in their final positions; Fig. 4 is a plan view of a portion of a tire showing the connecting device therein; and Fig. 5 is a transverse sectional view taken on the line 5—5 of Fig. 3.

In these drawings I have illustrated one embodiment of my invention and in connection therewith have shown a connecting device comprising an elongated member the end portions of which are adapted to be inserted in longitudinal openings in the respective ends of the tire, by the relative longitudinal movement of the parts, and the end portions of which are provided with barbs to bite into the material of the tire and prevent the separation of the parts. Preferably the connecting device consists of a relatively thin metallic strip 6 having its ends tapered, as shown at 7, to facilitate its entry into the openings in the tire, and having both edges provided with notches to form barbs 8. The barbs have their forward edges, that is the edges adjacent to the ends of the strip, inclined or tapered so that when the strip is inserted in the opening in the tire the material will be displaced as the barbs are forced past the same and will then contract at the rear end of the barb so that the latter will firmly engage the material and prevent the separation of the strip and the tire. The barbs on the two end portions of the connecting device face in opposite directions, that is, toward the transverse center line of the strip. The overall width of the strip is somewhat greater than the width of the opening in the tire so that the barbs will project into the rubber, or other material, of the tire a substantial distance and will provide a very firm strong connection. The opening with which the tire is usually provided, to receive the attaching wire, may be utilized in connection with my connecting device but obviously it is not necessary that the opening should extend for the full length of the tire. I prefer that the strip or body of the connecting device should be curved about the axis of the rim so that it will have initially the shape which it must assume when inserted in the ends of the tire. However, it is not essential that the strip have the initial curvature as its flexibility will permit it to accommodate itself to the curvature of the tire.

In connecting the tire with the wheel the tire 9 is placed in position on the rim 10 with its ends separated a distance substantially equal to the length of the connecting device. The pointed ends of the connecting device are then inserted in the openings in the respective ends of the tire and it is thereby supported in its proper position with relation to the rim and to the tire. Pressure is then applied to the two ends of the tire to move the same lengthwise one toward the other. This movement is relative to the connecting device and as the ends of the tire approach one another they will envelope the respective end portions of the connecting device and the two ends of the tire will meet in abutting contact at approximately the transverse center line of the connecting device. The barbs on the connecting device hold the end portions of the tire in the position to which they have been moved and positively prevent the separation thereof.

While I have shown and described one form of connecting device and the method of applying the same I wish it to be understood that I do not desire to be limited to the details thereof as various modifications may occur to a person skilled in the art.

Having now fully described my invention, what I claim as new and desire to secure by Letters Patent, is:

1. A device for securing a tire to a wheel comprising a bar the respective end portions of which are adapted to enter longitudinal openings in the abutting ends of a flexible tire, each end portion of said bar having a plurality of rigid barbs, the barbs on the two end portions facing in opposite directions and each barb having its forward edge extending at an acute angle to the length of said bar and having its rear edge extending transversely to said bar to provide an abrupt shoulder which will be immediately engaged by the material of the tire which has been displaced by the inclined forward edge of the barb, whereby when the ends of said tire have been brought into abutting engagement they will be firmly held against separation.

2. A device for securing a tire to a wheel comprising an elongated member having its end portions shaped to enter longitudinal openings in the abutting ends of a flexible tire, each end portion of said member having in each edge thereof a series of notches forming barbs, each notch having one wall thereof extending at an acute angle to the length of said member to provide a sharply inclined edge for one barb and having its other wall extending transversely to said member to provide an abrupt rear edge for the next preceding barb, which edge will be immediately engaged by the material of said tire which has been displaced by the inclined forward edge of that barb, whereby when the ends of said tire have been brought into abutting engagement they will be firmly held against separation.

In testimony whereof, I affix my signature hereto.

CHARLES C. BLACKMORE.